W. H. CAHALL.
FLUID PRESSURE MOTOR AND CONTROLLING MECHANISM THEREFOR.
APPLICATION FILED MAY 8, 1909.

976,983.

Patented Nov. 29, 1910.

Witnesses:
Clara Norton
Frank W. Bemm

Inventor:
William H. Cahall
by Peirce & Fisher
Attys.

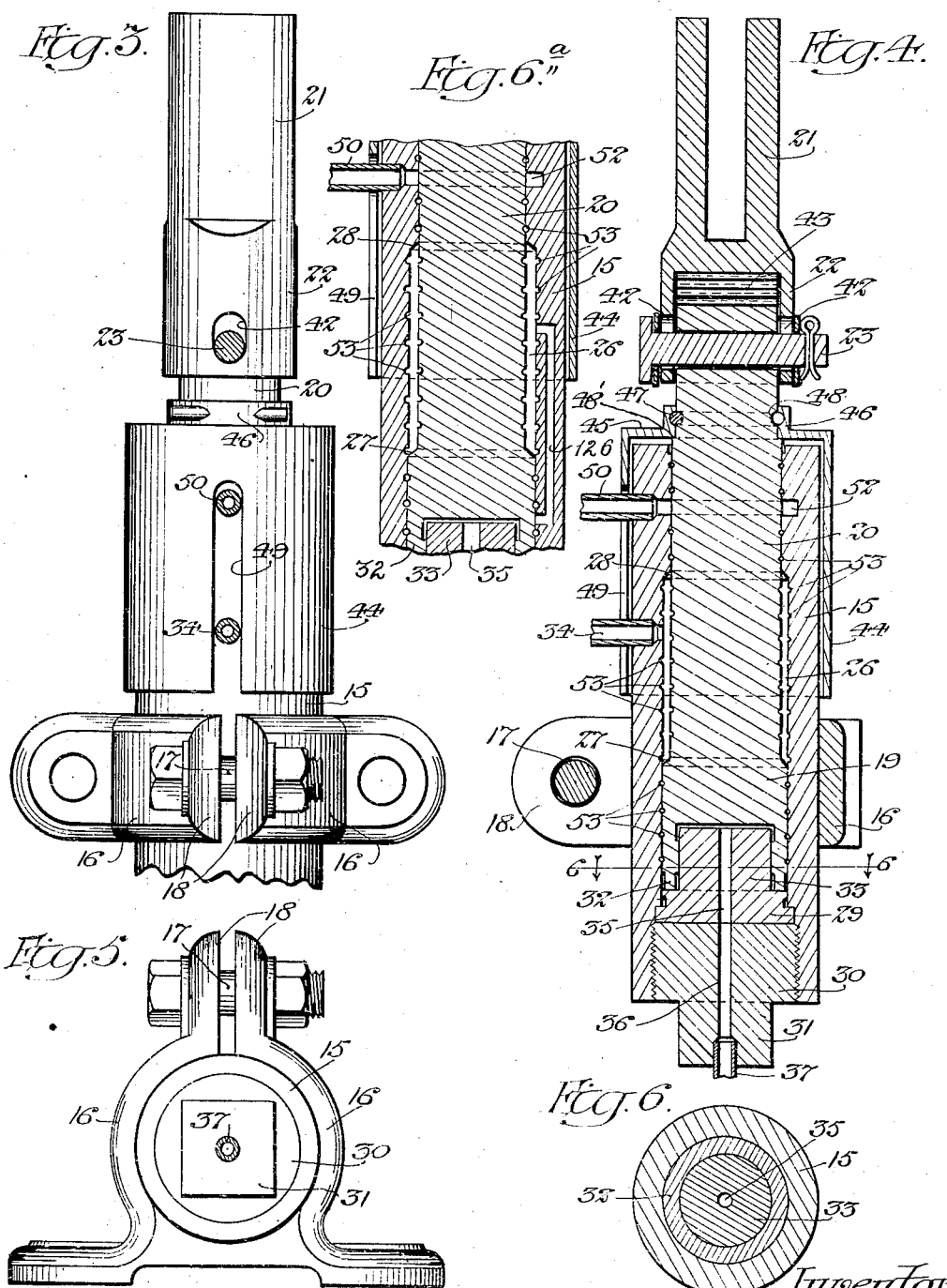

W. H. CAHALL.
FLUID PRESSURE MOTOR AND CONTROLLING MECHANISM THEREFOR.
APPLICATION FILED MAY 8, 1909.
976,983.
Patented Nov. 29, 1910.
4 SHEETS—SHEET 3.
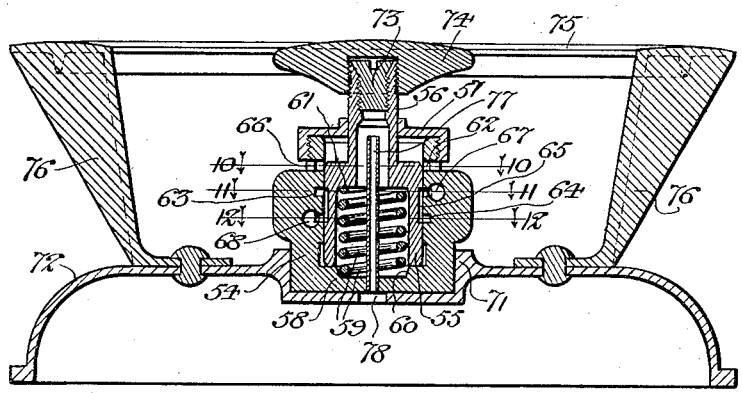
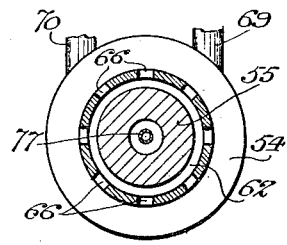
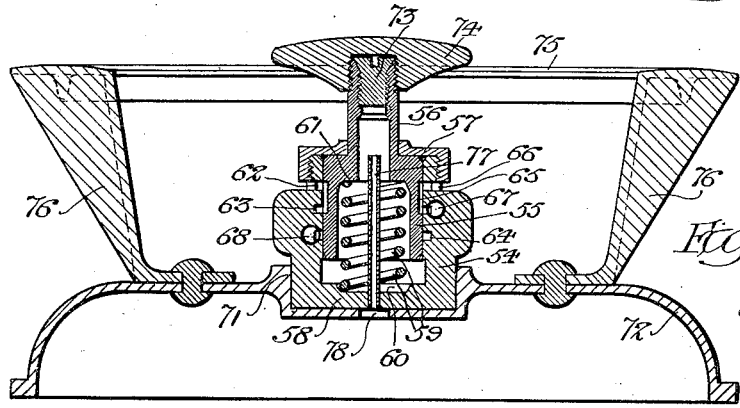
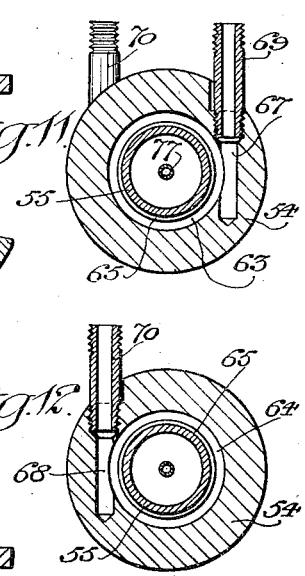
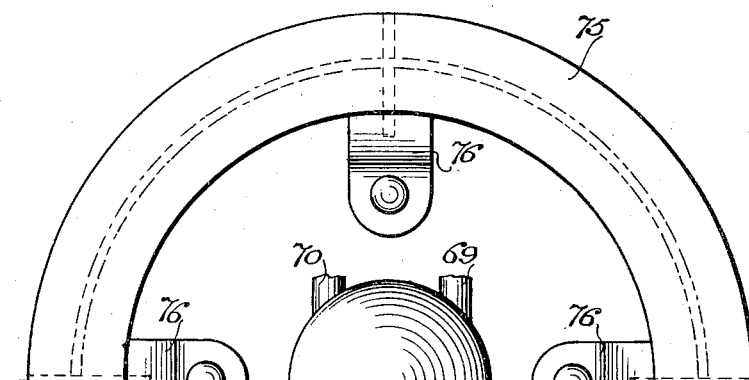
Witnesses:-
Clara Norton
Frank W. Benn
Inventor:-
William H. Cahall
by Peirce & Fisher
Attys.

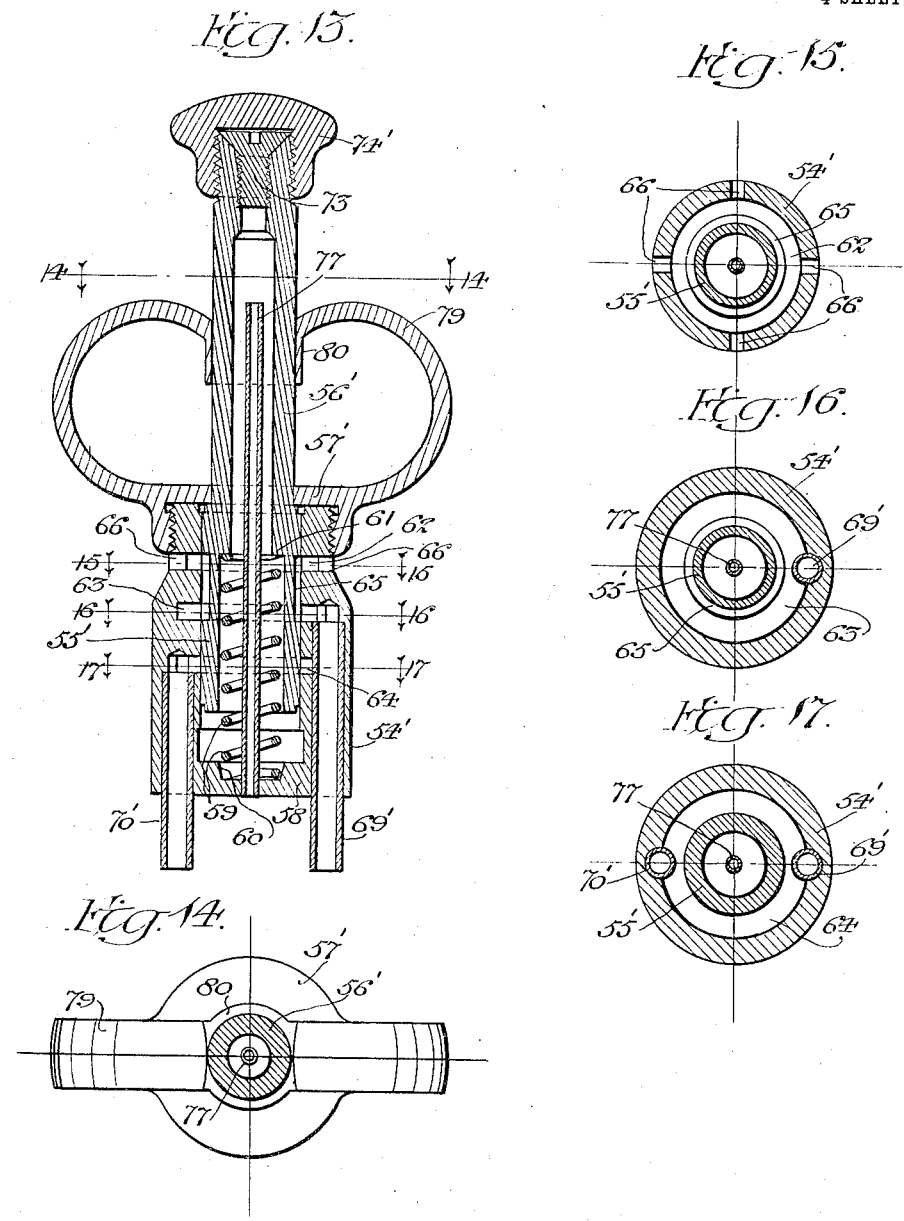

UNITED STATES PATENT OFFICE.

WILLIAM H. CAHALL, OF CHICAGO, ILLINOIS.

FLUID-PRESSURE MOTOR AND CONTROLLING MECHANISM THEREFOR.

976,983.  Specification of Letters Patent.  Patented Nov. 29, 1910.

Application filed May 8, 1909. Serial No. 494,900.

*To all whom it may concern:*

Be it known that I, WILLIAM H. CAHALL, a citizen of the United States, and a resident of Chicago, county of Cook, and State of Illinois, have invented certain new and useful Improvements in Fluid-Pressure Motors and Controlling Mechanism Therefor, of which the following is a specification.

The invention relates to fluid pressure motors employed for automatically shifting a part at the required time.

More particularly, the invention relates to manually operated controlling mechanism for such fluid pressure motors.

While the invention may be used for other purposes, it is more particularly applicable as a shifter for the clutch or starting mechanism of a punching, shearing or forging machine which is set in motion by the operator after he has placed the work in proper relation thereto.

The invention seeks to provide an improved motor mechanism of this type, together with a portable controlling device for the motor which can be located at any desired point by the operator, and thus conveniently manipulated by him while he is holding the work in proper position to be acted upon by the machine.

Heretofore, the clutch mechanism of punching, forging and shearing machinery has usually been controlled by a tripping foot lever, but the operator, while he is shifting the work to be acted upon by the machine, is necessarily often in a position where he cannot readily reach the foot lever.

The present invention provides a fluid pressure motor for controlling the shift of the clutch mechanism, together with a portable valve for controlling the operation of the motor and which can be located at any desired point within easy reach of the operator.

With these and other objects in view, the invention consists in the features of improvement hereinafter set forth, illustrated in the accompanying drawings and more particularly pointed out in the appended claims.

Figure 1:
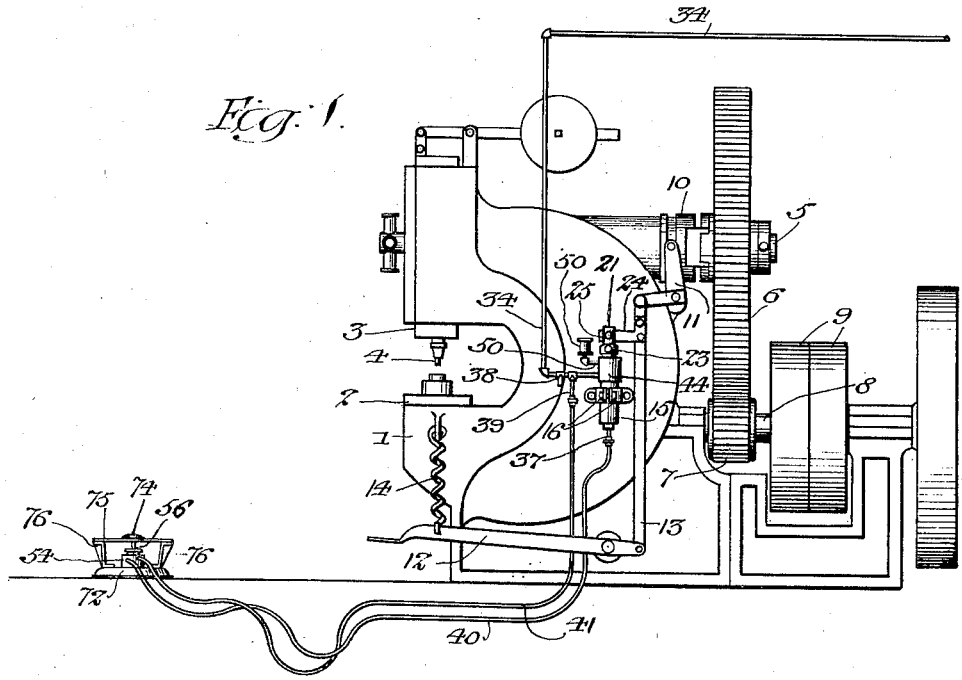
Figure 2:
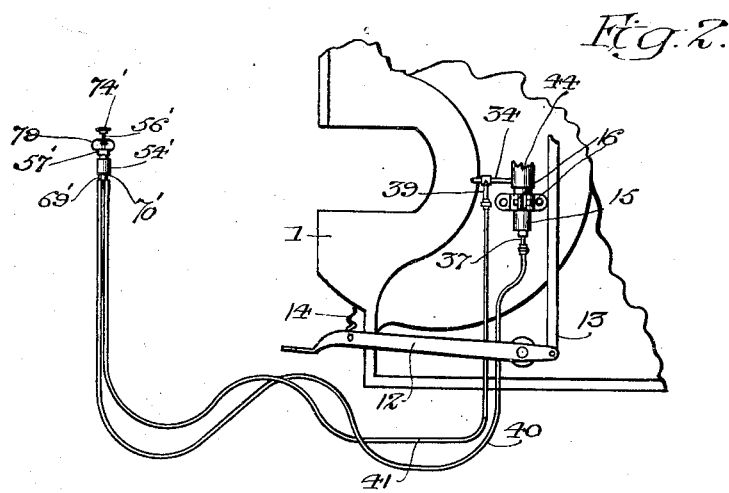

In the drawings, Figure 1 is a view in side elevation of a punching machine with the improved controlling mechanism applied thereto. Fig. 2 is a partial, similar view illustrating a modified form of controlling valve. Fig. 3 is a view in elevation of the upper portion of the motor cylinder. Fig. 4 is a view in longitudinal section of the motor cylinder. Fig. 5 is an inverted plan view thereof. Fig. 6 is a cross section on the line 6—6 of Fig. 4. Figs. 7 and 8 are sections of the controlling valve shown in Fig. 1 with the valve shown in different positions. Fig. 9 is a plan view of one-half of the controlling valve shown in Figs. 7 and 8. Figs. 10, 11 and 12 are detail sections on the lines 10—10, 11—11 and 12—12 respectively of Fig. 7. Fig. 13 is a longitudinal section of the controlling valve as shown in Fig. 2. Fig. 14 is a plan view thereof with parts shown in section on the line 14—14 of Fig. 13. Figs. 15, 16 and 17 are detail sections on the lines 15—15, 16—16 and 17—17 of Fig. 13.

The invention is shown applied to a punching machine. This machine is of usual form and comprises a frame 1 having a suitable anvil 2 on its lower portion and a reciprocating head 3 carrying a punch 4 on its upper portion. The head 3 is driven from a shaft 5 journaled in the upper portion of the machine. A large gear 6 loosely mounted on this shaft meshes with a pinion 7 on a main drive shaft 8 journaled in the lower portion of the machine frame. This shaft is connected to a suitable source of power through the medium of tight and loose pulleys 9 thereon or in any other suitable manner. A sliding clutch member 10 is keyed to the shaft 5 and is provided with lugs or teeth which are arranged to interlock with similar lugs or teeth upon the hub of the gear 6. The clutch member 10 is shifted by a bell-crank 11 pivoted on the frame and connected to a foot-pedal 12 by a link 13. The foot-pedal or lever is pivoted on the frame and, in the form shown, a spring 14 extends between the forward end of the foot lever and a lug on the frame. This spring normally holds the forward end of the foot lever uplifted and the clutch member 10 out of engagement with the gear 6. In the ordinary practice, the operator adjusts his work in the proper position upon the anvil 2 and beneath the punch 4 and then sets the machine in operation to shift the punch by depressing the forward end of the foot lever to throw the clutch member 10 into engagement with the gear 6 and thus drive the shaft 5 and reciprocating head 3. It often happens that a piece of work is so large, or for other reasons, that the operator cannot, at the same time, hold the work in position and also reach the foot lever 12, so that it requires two workmen to operate the machine.

In accordance with the present invention, the clutch member 10 is shifted by a fluid pressure motor comprising a cylinder 15. This cylinder is mounted upon the side of the frame 1 by a clamp comprising two members 16 that are bolted to the machine frame. These clamp members encircle the cylinder and are gripped thereon by a bolt 17 extending through lugs 18 on the clamp members. The cylinder is provided with a piston 19 and a piston rod 20 which projects through the upper end of the cylinder, and a forked extension 21 having a sleeve-like lower end portion 22 fits over the upper end of the piston rod and is connected thereto by a bolt 23. The forked extension engages an arm 24 (see Fig. 1,) upon the link 13. The piston and piston rod are shifted positively back and forth by air or other suitable fluid under pressure and the forked extension 21 can be connected to the arm 24 by a pivot pin or bolt 25, as shown in Fig. 1, to positively shift the clutch member 10 to operative position and back to neutral position. In some cases, the forked extension 21 will merely have a one-way engagement with the arm 24, so that the fluid pressure motor will merely shift the clutch member 10 to its operative position and the clutch will be returned to neutral position in any suitable manner, as, for example, by means of the spring 14 on the foot-lever 12.

While any suitable motor cylinder can be employed, the preferred form is illustrated in Figs. 3 to 6 inclusive. In this form, the piston 19 is snugly fitted within the cylinder and the piston rod 20, formed in piece therewith, is only slightly smaller in diameter and snugly fits the reduced portion of the bore of the cylinder at the upper end thereof. This arrangement leaves a narrow, annular space 26 between the cylindrical surfaces of the piston rod and cylinder and between the annular shoulders 27 and 28 thereon. The piston 19 rests upon a plug 29 seated within the lower end of the cylinder and held in place by a screw-plug 30 threaded into the cylinder and provided on its outer face with a lug 31 which is square or otherwise suitably shaped to receive a wrench. The lower end of the piston is provided with an annular portion 32 and the plug 29 is provided with a reduced portion 33 which fits within the annular portion of the piston.

A supply pipe 34 for compressed air or other fluid under pressure, is connected to the cylinder and communicates with the annular space 26 (see Figs. 1 and 4). The end plugs 29 and 30 are provided with communicating passages 35 and 36 which open into the cylinder beneath the piston and which communicate with a coupling pipe 37 fixed in the end of the lug 31 on the plug 30. The supply pipe 34 is provided with a screening device indicated at 38 in Fig. 1 and with a coupling pipe 39. The coupling pipes 37 and 39 are connected by flexible pipes 40 and 41 to the controlling valve. The space 26 above the piston is always in communication with the source of supply through the pipe 34 while the lower end of the cylinder is normally connected through the controlling valve to the exhaust. By shifting the controlling valve, the air under pressure, or other motive fluid, is admitted through the flexible pipes 41 and 40 and coupling pipe 37 to the lower end of the piston. The area of the lower end of the piston is much greater than that of the annular shoulder 27 which forms its upper face, so that the piston and piston rod are then shifted to throw the clutch member 10 to operative position, the air in the space 26 being forced through the pipe 34. As the piston reaches the upper end of its stroke, it closes the port leading to the pipe 34, so that the air remaining in the space 26 is compressed between the shoulders 27 and 28 to cushion the up stroke of the piston and prevent injury of the parts by the striking of the shoulder 27 on the shoulder 28. The air compressed in the upper end of the space 26 serves to initially force the piston back to neutral position as soon as the lower end of the cylinder is again placed in communication with the exhaust by means of the controlling valve. When the piston again uncovers the port leading to the supply pipe 34, compressed air is admitted to the space 26 and the piston is forced back and is held in neutral position by the pressure of the air upon the shoulder 27, the air below the piston being forced out through the passages 35 and 36, coupling pipe 37 and flexible pipe 40. As the piston approaches the end of its return movement, the annular portion 32 thereof enters the space between the cylinder wall and the portion 33 of the plug 29, so that a certain amount of air is caught in this space and compressed to cushion the return stroke of the piston. This prevents the piston from striking sharply upon the plug 29 and thus saves the parts from injury. The surfaces of the piston, piston rod, cylinder and portion 33 of the plug 29 are nicely finished and fitted. To further prevent injury to these finished faces, the edges thereof are cut away, as shown. As stated, the arm 24 may have a one-way connection with the forked extension 21 and be returned to normal position independently thereof. To prevent strain on the pin 23 and the working parts of the motor cylinder when the arm 24 is thus sharply returned into engagement with the forked extension 21, the latter preferably has a lost-motion connection with the piston by providing elongated slots 42 in the lower, sleeve portion 22 thereof through which the pin 23 extends, and by providing a cushion or buffer 43 of rubber or the like between the upper end of the piston rod and the extension 21 and within the sleeve portion 22 of the latter.

To protect the finished face of the piston rod from damage when it is projected from the cylinder, a sleeve 44 is fixed to the piston rod and reciprocates over the upper end of the cylinder. This sleeve is provided with an annular end wall 45 having a flange 46 and it is secured to the piston rod by a pin 47 which extends tangentially through the flange 46 and into an annular groove 48 formed in the surface of the piston rod. The annular end wall 45 of the sleeve also engages a shoulder 48' formed on the piston rod. At one portion, the protecting sleeve 44 is provided with a longitudinal slot through which the air supply pipe 34 and an oil pipe 50 extend. The connection of the protector sleeve with the piston rod is such as to permit the relative rotation of the latter with reference to the sleeve and cylinder, so that, in applying the device to machines already in use, the forked extension 21 may be adjusted to any desired position to properly engage the clutch shifting parts. Moreover, the motor cylinder itself can be adjusted to any desired position within the supporting clamp member 16, so that the pipes 34 and 50 can lead to the cylinder in any convenient direction.

The pipe 50 leads from an oil-cup 51 (see Fig. 1) and opens into an annular groove 52 formed in the face of the bore of the cylinder above the shoulder 28. The faces of the piston, piston rod and cylinder are provided with grooves 53 which retain the oil and prevent the leaking of the air from one to the other side of the piston and from the space 26 through the upper end of the cylinder. The plug 29 in the lower end of the cylinder, can be removed and a shorter or longer plug substituted therefor to thereby vary the stroke of the piston to suit different conditions. The motor cylinder is thus adapted for use in connection with many different kinds of machines and can readily be applied to machines already in use. When it is so applied, the usual foot lever 12 or other suitable controlling means are preferably retained as illustrated, and either the motor cylinder or the foot lever can be employed for shifting the clutch, since the operation of either of these devices does not interfere with that of the other. Moreover, if the supply of compressed air should fail or if the motor mechanism should get out of operation, the foot-lever mechanism could still be employed for controlling the operation of the machine.

One form of the controlling valve is shown in Figs. 7 to 12 inclusive. It comprises a valve casing 54 having a cylindrical bore within which a cylindrical sliding valve 55 is fitted. The valve is provided with an upper, reduced end portion or stem 56, and a cap 57 threaded upon the upper, reduced end of the valve casing, limits the upward movement of the valve. The lower end of the valve casing is closed by a bottom wall 58 and the interior of the valve 55 and stem 56 are cored out as shown, to form a chamber for holding lubricating material. A coiled spring 59, arranged within the valve casing and valve, is seated, at its lower end, in a recess 60 formed in the bottom wall 58 of the valve casing and the upper end of the spring engages a shoulder 61 at the upper portion of the valve 55 to hold the latter normally in its uppermost position in engagement with the cap 57, as shown in Fig. 8. The valve seat or bore of the valve casing 54 is provided with three narrow, annular grooves 62, 63 and 64 spaced apart as shown, and the cylindrical face of the valve 55 is provided with an annular groove 65 of sufficient width to connect the intermediate groove 63 either with the exhaust groove 62 or inlet groove 64. A series of radial ports 66 communicate with the exhaust groove 62 and tangential ports or passages 67 and 68 communicate with the annular grooves 63 and 64. Coupling pipes 69 and 70 are threaded into the valve casing and communicate with the ports 67 and 68, as shown in Figs. 11 and 12, and these pipes are connected respectively by the flexible pipes 40 and 41 to the motor cylinder and to the supply pipe 34.

The spring 59 normally holds the valve in a neutral position shown in Fig. 8, so that the lower end of the motor cylinder is placed in communication with the exhaust passages of the valve. By depressing the valve, the lower end of the motor cylinder is placed in communication with the source of supply of compressed air or other fluid under pressure and is operated as above described. When pressure on the valve is relieved, the spring 59 of course restores it to its normal, neutral position and the piston of the motor cylinder is then, as previously described, returned to its normal, neutral position.

The valve casing 54 in the forms shown in Figs. 7 to 12 inclusive, is adapted to be removably mounted in a suitable seat 71 formed in a cast metal shoe 72 that, as shown in Fig. 1, can be placed on the floor in any suitable or convenient position. The valve can be readily removed from the shoe 72 for lubricating, repairs or the like, but is securely held in position when placed in the seat 71 of the shoe. The upper end of the valve stem 56 is closed by a screw 73 which can be removed to fill the interior of the casing with lubricating material. A head or push-button 74 is removably threaded upon the stem 56 and is adapted to be engaged by the foot of the operator to shift the valve to operative position. A ring guide or foot-rest 75 surrounds the foot button 74 and is provided with depending supporting lugs 76 which are riveted to the shoe 72. This ring guide or foot-rest also acts to protect the valve from injury. This form of valve can be placed in any convenient position on the floor and be conveniently operated by any portion of the operator's foot.

A vent tube 77 extends upwardly from the bottom wall 58 of the valve casing into the chamber of the valve. At its lower end, the vent tube is open to the atmosphere through an opening 78 formed in the seat 71 of the shoe. This vent tube permits the escape of any air under pressure which may leak past the valve into the lubricant-containing chamber. The loss of motor fluid effected in this way, is insignificant from an economical standpoint but, if a vent tube were not provided, air under pressure would accumulate in the lubricant chamber and prevent the ready operation of the valve. Moreover, by means of a vent tube, the pressure in the lubricant chamber is always that of the atmosphere and the construction of the valve as a whole is such that the pressure thereon is balanced, so that the only resistance which must be overcome by the operator in shifting the valve, is that of the spring 59, which can be quite light to permit easy operation of the valve.

The form of controlling valve shown in Fig. 2, and in detail in Figs. 13 to 17 inclusive, is designed to be held in the operator's hand. The ports and passages of this valve are similar to those described and are similarly numbered, except that the coupling pipe 69′ and 70′ which communicate with the grooves 63 and 64, extend in axial direction through the bottom of the valve casing 54′ instead of through the side wall thereof. The valve casing 54′ and valve 55′ are similar to the corresponding parts of the foot valve, except that they are somewhat longer, as shown in Fig. 13. The cap plate 57′ which is threaded upon the upper end of the casing 54′, is provided with an elliptical handle 79 having a central sleeve 80 through which the valve stem 56′ extends. The push button 74′ on the upper end of the valve stem 56′, is somewhat smaller than that shown in Figs. 7 to 9 inclusive, but the remaining parts are alike and are similarly numbered. Both forms of valves are balanced and the contacting surfaces are nicely finished and cut away or relieved at their edges to prevent injury thereto.

With the present improved operating motor and portable controlling valve, the operator can be in the most advantageous position for adjusting his work to a punching, shearing or like machine and, at the same time, can instantly engage the clutch to set the machine in operation when the work is in proper position. With the old stationary trip-lever, an additional helper is often required for tripping the clutch. With punching, shearing machines and the like, the clutch is often automatic in operation. That is to say, the operator merely shifts the clutch to operative position and it is then held by suitable parts in operative position and automatically returned to neutral position after the machine has performed a certain predetermined movement, usually one revolution of the operating shaft. In other forms, the clutch is not automatic and the operator must hold it in engagement by holding the depressing foot-lever depressed until the machine has made the desired number of operations. The present improvement is applicable to either form of clutch mechanism. With the automatic form, the piston of the fluid pressure motor would merely have a one-way engagement with the clutch shifting part and the operator would simply momentarily hold the controlling valve in shifted position. In a non-automatic type of clutch, the operator would hold the controlling valve in shifted position to hold the clutch member in engaged position until the desired operation had been performed. In this form, the piston of the motor cylinder could be connected to positively shift the clutch back and forth, or it could have a one-way engagement with the clutch shifting part and the clutch then returned to neutral position by a spring.

It is obvious that the improved mechanism could be readily applied to machines now in use and that numerous changes can be made in the details set forth without departure from the essentials of the invention as defined in the claims.

I claim as my invention:—

1. The combination with a fluid pressure motor, of a portable controlling device and flexible connections between said device and said motor, said device being arranged to control the admission and exhaust of fluid under pressure to and from said motor and comprising a cylinder, a shiftable part fitting said cylinder and having a projecting stem with a push-button thereon, said part being spring-held in normal, neutral position, substantially as described.

2. The combination with a fluid pressure motor, of a portable valve casing, flexible pipes for connecting said casing to said motor and to a suitable source of supply, and a shiftable valve in said casing spring-held in normal, neutral position, said valve in neutral position being arranged to connect said motor cylinder to the exhaust and in shifted position to the supply, substantially as described.

3. The combination with a motor cylinder, of a portable valve casing having inlet and exhaust ports and an intermediate port, flexible pipes connecting said intermediate port and said inlet port to said motor cylinder and to a suitable source of supply, a shiftable valve in said casing, and a spring for holding the same in normal, neutral position, said valve being arranged to connect said intermediate port to said exhaust port when in normal, neutral position and, in shifted position, to connect said intermediate port to said inlet port, said valve having a stem projecting from said casing whereby it may be manually shifted.

4. The combination with a fluid pressure motor and a supply pipe for fluid under pressure, of a portable valve casing having inlet and exhaust ports and an intermediate port, flexible pipes connecting said casing to said supply pipe and to said motor and communicating respectively with said inlet port and said intermediate port, a slide valve in said casing, and a spring for holding said valve in neutral position, said valve being arranged to connect said intermediate and exhaust ports in neutral position and said intermediate and inlet ports in shifted position, and said valve having a projecting stem provided with a push-button, substantially as described.

5. The combination with a motor cylinder, a piston in said cylinder having an enlarged piston rod, and a supply pipe communicating with the inner end of said cylinder, a portable valve casing having inlet and exhaust ports, flexible pipes connecting said casing to the outer end of said cylinder and to said supply pipe, and a shiftable valve in said casing for alternately connecting the outer end of said cylinder to said exhaust and said inlet ports, substantially as described.

6. The combination with a fluid pressure motor, of a portable shoe, a controlling device for said motor removably mounted on said shoe, a flexible pipe connecting said controlling device and said motor, said controlling device comprising a casing, a shifting part therein having a projecting stem provided with a foot button, and a ring-shaped rest on said shoe surrounding said button, substantially as described.

7. The combination with a fluid pressure motor, of a portable shoe, a valve casing having inlet and exhaust ports removably mounted on said shoe, flexible pipes for connecting said casing to said motor and to a source of supply, and a valve in said shoe spring-held in neutral position and arranged to connect said motor to the exhaust in neutral position and to the supply in shifted position, said valve having a projecting stem provided with a foot button, and said shoe having a guiding foot rest extending around said button, substantially as described.

8. In starting and stopping mechanism, the combination with a controlling shifter, of a fluid pressure motor for operating said shifter, a manually operated lever for actuating said shifter, a portable controlling valve for said motor, and flexible pipes for connecting said valve to said motor and to a suitable source of supply, substantially as described.

9. In starting and stopping mechanism, the combination with a controlling clutch, of a manually operable shifter for said clutch, a motor cylinder, a piston thereon arranged to shift said clutch, and a portable controlling device for said motor cylinder flexibly connected thereto, substantially as described.

10. In starting and stopping mechanism, the combination with a controlling clutch, of a manually operable shifter for said clutch, a motor cylinder, a piston therein having a yielding, lost-motion connection with said clutch shifter, a portable controlling valve for said motor cylinder, and flexible pipes connecting said valve to said cylinder and to a suitable source of supply, substantially as described.

11. The combination with a fluid pressure motor and a suitable source of supply, of a portable valve casing having inlet and exhaust ports and a third port, a valve in said casing having an external, manually, shiftable, operating member, said valve being arranged in normal position to close said inlet port and connect said third port to said exhaust port, and in shifted position to close said exhaust port and connect said inlet port to said third port, and a pair of flexible pipes connected to said casing and communicating respectively with said supply port and said third port, the opposite ends of said pipes leading from adjacent fixed points and communicating respectively with said source of supply and said motor, substantially as described.

WILLIAM H. CAHALL.

Witnesses:
  CLARA A. NORTON,
  KATHARINE GERLACH.